(12) United States Patent
Kubota

(10) Patent No.: US 10,711,684 B2
(45) Date of Patent: Jul. 14, 2020

(54) FLUID FAN CLUTCH

(71) Applicant: USUI CO., LTD., Shizuoka (JP)

(72) Inventor: Satoshi Kubota, Shizuoka (JP)

(73) Assignee: USUI CO., LTD., Shizuoka (JP)

( * ) Notice: Subject to any disclaimer, the term of this patent is extended or adjusted under 35 U.S.C. 154(b) by 0 days.

(21) Appl. No.: 16/315,159

(22) PCT Filed: Jun. 28, 2017

(86) PCT No.: PCT/JP2017/023744
§ 371 (c)(1),
(2) Date: Jan. 4, 2019

(87) PCT Pub. No.: WO2018/008489
PCT Pub. Date: Jan. 11, 2018

(65) Prior Publication Data
US 2019/0218957 A1    Jul. 18, 2019

(30) Foreign Application Priority Data
Jul. 7, 2016   (JP) ................................. 2016-135327

(51) Int. Cl.
*F01P 7/08*   (2006.01)
*F16D 35/02*  (2006.01)
*F04D 19/00*  (2006.01)

(52) U.S. Cl.
CPC .............. *F01P 7/08* (2013.01); *F04D 19/002* (2013.01); *F16D 35/02* (2013.01); *F16D 35/024* (2013.01)

(58) Field of Classification Search
CPC . F01P 7/042; F01P 7/08; F04D 19/002; F16D 33/08; F16D 33/18; F16D 33/06–18
See application file for complete search history.

(56) References Cited

U.S. PATENT DOCUMENTS

| 4,169,693 | A | * | 10/1979 | Brubaker | ............... B60K 11/00 416/169 A |
| 4,685,549 | A | * | 8/1987 | Brunken | ............... F16D 35/022 192/112 |
| 5,782,715 | A | * | 7/1998 | Walton | .................... F01P 7/042 475/48 |
| 5,893,441 | A | * | 4/1999 | Reeb | ..................... F16D 35/029 192/58.43 |

(Continued)

FOREIGN PATENT DOCUMENTS

| JP | S45-5964 B | 2/1970 |
| JP | S60-175818 U | 11/1985 |

(Continued)

*Primary Examiner* — Jacob S. Scott
(74) *Attorney, Agent, or Firm* — Hauptman Ham, LLP

(57) ABSTRACT

Provided is a fluid fan clutch with excellent cooling performance capable of effectively preventing, by very simple means, a decrease in the volume of air due to backflow of cooling fan air occurring when the fan clutch is activated. The fluid fan clutch has a structure with a fan removably fixed to a housing composed of a front-side housing component (cover) and a back-side housing component (case), wherein projecting parts for preventing backflow of fan air are arranged on the back-side housing component so as to be shifted in the circumferential direction with respect to fixing projections of the front-side housing component.

1 Claim, 7 Drawing Sheets

(56) References Cited

U.S. PATENT DOCUMENTS

2004/0124057 A1    7/2004  Shiozaki et al.
2018/0291969 A1*  10/2018  Stagg .................... F16D 35/021

FOREIGN PATENT DOCUMENTS

| JP | H1-69921 U    | 5/1989 |
| JP | 2002-81466 A  | 3/2002 |
| JP | 2004-162911 A | 6/2004 |

* cited by examiner

FLUID FAN CLUTCH

RELATED APPLICATIONS

This application is a national phase of International Application Number PCT/JP2017/023744, filed Jun. 28, 2017, which claims priority of Japanese Patent Application No. 2016-135327, filed on Jul. 7, 2016.

TECHNICAL FIELD

The present invention generally relates to fluid fan clutches of a type controlling fan rotation for engine cooling in automobiles and so forth by following changes in outer ambient temperature or changes in rotation and, in more detail, to a fluid fan clutch capable of preventing a decrease in the volume of air due to backflow of cooling fan air occurring at the time of activation of the fan clutch.

BACKGROUND ART

Conventionally, as a fan clutch of this type, a fluid friction clutch for driving an engine cooling fan of a vehicle has been known (refer to Patent Literatures 1 and 2 and so forth). This fluid friction clutch has features as follows. The fluid friction clutch is structured to include a drive disk and a housing, an annular supply chamber (annular supply room) and a working chamber (activation room), a supply device for supplying shear fluid (oil) from the supply chamber to the working chamber and a reflow device for causing the shear fluid from the working chamber to reflow to the supply chamber, part of the supply chamber including a storage chamber (storage room) for the shear fluid and this storage chamber being separated from the working chamber by another portion of the supply chamber. The storage chamber is structured of an annular segment, the annular segment of the storage chamber is formed as a replenish container, the supply chamber includes at least one supply port and at least one reflow port (recycling port), and these supply port and reflow port form part of the supply device and the reflow device, respectively.

Also, a fan clutch capable of removably fixing a fan by a flange ring has been known, in which the fan clutch includes front-side and back-side housing components and the flange ring can be fixed to the housing by a coupling element. The fan clutch is configured so that when a fixing projection (tab) arranged on the flange ring is fixed to a fixing projection formed on the housing by the coupling element, the fixing projection (tab) arranged on the flange ring can fit from the front side or the back side of the fan clutch.

CITATION LIST

Patent Literatures

PTL 1: Japanese Patent Application Laid-Open No. 2002-81466

PTL 2: Japanese Patent Application Laid-Open No. 2004-162911

SUMMARY OF INVENTION

Technical Problem

Of the above-described conventional fluid friction clutches, the fan clutch including the front-side and back-side housing components in which the fan can be removably fixed to the housing by the flange ring has a main feature in which assembling (installation) and disassembling of the fan is simplified. However, the fan clutch of this type has a structure in which backflow of cooling fan air occurs from a gap formed between the housing component and the flange ring at the time of activation of the clutch. Therefore, to prevent a decrease in the volume of air due to backflow of cooling fan air, it is required to generate the volume of air with the backflow taken into account. This not only necessitates an increase in horsepower consumption of the fan but also poses problems of causing a decrease in durability of the fan clutch due to this increase in horsepower consumption of the fan, degradation in fuel efficiency due to output loss, and so forth. Also, when measures are taken such as providing a cover as a separate component made of, for example, rubber or the like, to the flange ring for the purpose of the backflow prevention, the number of components and the number of assembling processes are increased to unfavorably invite an increase in cost.

The present invention has been made to solve the problems in the conventional fan clutch, and is to provide a fluid fan clutch with excellent cooling performance capable of effectively preventing, by very simple means, a decrease in the volume of air due to backflow of cooling fan air occurring at the time of activation of the fan clutch, without taking measures such as increasing the number of components.

Solution to Problems

A fluid fan clutch according to the present invention is configured such that cover parts for backflow prevention are provided to a housing so as to be integral with the housing, and the gist of the invention is as follows: the fluid fan clutch has a structure in which a fan is removably fixed to the housing via a flange ring with a bolt, the housing is composed of a front-side housing component (cover) and a back-side housing component (case) and has radial fan fixing projections arranged at regular intervals in the circumferential direction on the outer circumference of the front-side housing component, and the flange ring is capable of fitting in the housing from the front side or the back side of the fan clutch, wherein the back-side housing component includes projecting parts for preventing backflow of fan air integrally with the housing back-side component, and the projecting parts are arranged to be shifted in the circumferential direction with respect to the fan fixing projections of the front-side housing component.

Advantageous Effects of Invention

By arranging, on the back-side housing component (case) opposing the front-side housing component (cover) for fan fixing, the projecting parts for preventing backflow of fan air to be shifted in the circumferential direction with respect to the fixing projections of the front-side housing component (cover), the fluid fan clutch according to the present invention can prevent backflow of cooling fan air occurring when the fan clutch is activated. Therefore, it is possible to prevent a decrease in the volume of cooling fan air and improve fan performance. Furthermore, it is not required to take measures of providing a cover or the like as a separate component made of, for example, rubber or the like, to the flange ring for the purpose of the backflow prevention. Therefore, an increase in cost due to an increase in the number of components and the number of assembling processes is not invited, and a high-performance fluid fan clutch can be inexpensively provided.

DESCRIPTION OF EMBODIMENTS

Figure 1:
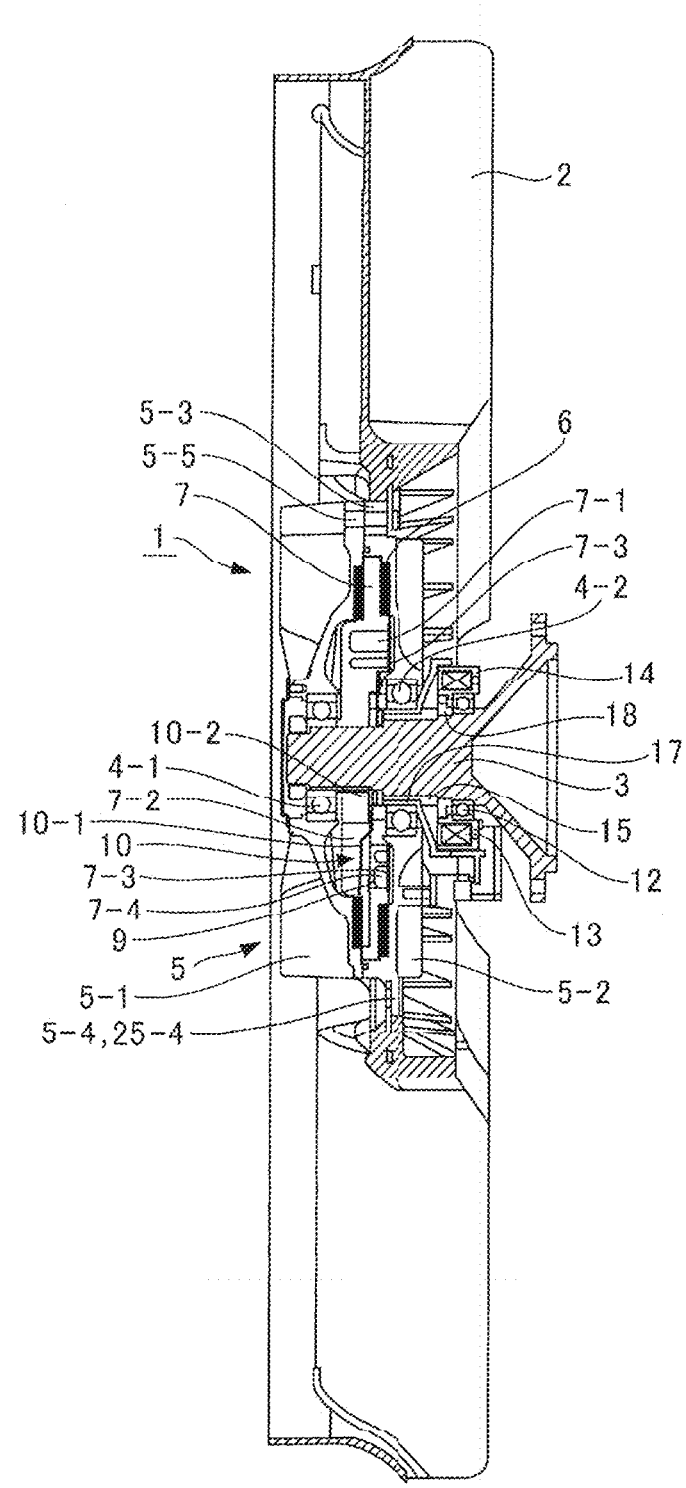
FIG. 1 is an axial-direction longitudinal sectional view of a first embodiment of a fluid fan clutch according to the present invention.

A fluid fan clutch of the first embodiment depicted in FIG. 1 is configured of a clutch main body 1 and a fan 2 fixed to the clutch main body 1 as an axial fan. In the clutch main body 1, to a rotation shaft body (drive shaft) 3 rotating by being driven by a drive part (engine), a housing (sealed container) 5 formed of a front-side housing component (cover) 5-1 and a back-side housing component (case) 5-2 via bearings 4-1 and 4-2 is supported. In a torque transmission chamber 6 provided in the housing 5, a drive disk 7 fixedly attached to the rotation shaft body 3 is internally mounted. Note that the drive disk 7 has a window hole 7-2 communicating with the torque transmission chamber 6 provided at one end of an annular oil reservoir chamber (oil storage room) 7-1 provided with its inside as being hollow and is fixedly attached to the rotation shaft body 3 between the bearings 4-1 and 4-2 supporting the housing 5 to the rotation shaft body 3. Also, the drive disk 7 is provided, inside the annular oil reservoir chamber 7-1, with an oil supply chamber 7-4 formed by a partition wall 7-3 of an arc-shaped wall concentrically with the oil reservoir chamber, and an oil circulation passage hole (oil supply port) 9 communicating with a torque transmission gap is provided on a side wall surface on an end side of the window hole 7-2 of the oil supply chamber. A valve member 10 which opens and closes the oil circulation passage hole 9 provided to the drive disk 7 is formed of a leaf spring 10-1 and an armature 10-2, and a base end of the leaf spring 10-1 is fixedly attached to a back surface side of the disk by a screw or the like so that the armature 10-2 is positioned near the rotation shaft body 3. The fan 2 is screwed via a flange ring 11 (FIG. 5), which will be described further below, into a screw hole 5-5 for attaching the fan provided at an end of the housing (sealed container) 5.

On a driving part side of the sealed container 5, a ring-shaped electromagnet 13 is supported to a ring-shaped electromagnet support body 14 supported to the rotation shaft body 3 via the bearing 12. A first magnetic ring 17 is arranged on the outer periphery of a cylindrical non-magnetic ring 15 fixed to the outer periphery of the rotation shaft body 3 between the electromagnet 13 and the valve member 10. Furthermore, between the electromagnet support body 14 of the electromagnet 13 and the rotation shaft body 3, a second magnetic ring 18 is fixed to externally fit onto the rotation shaft body 3 so as to be substantially in contact with the electromagnet support body 14. Note that the second magnetic ring 18 is provided so as to efficiently transfer magnetic flux of the electromagnet 13 to the armature 10-2 of the valve member.

Figure 2:
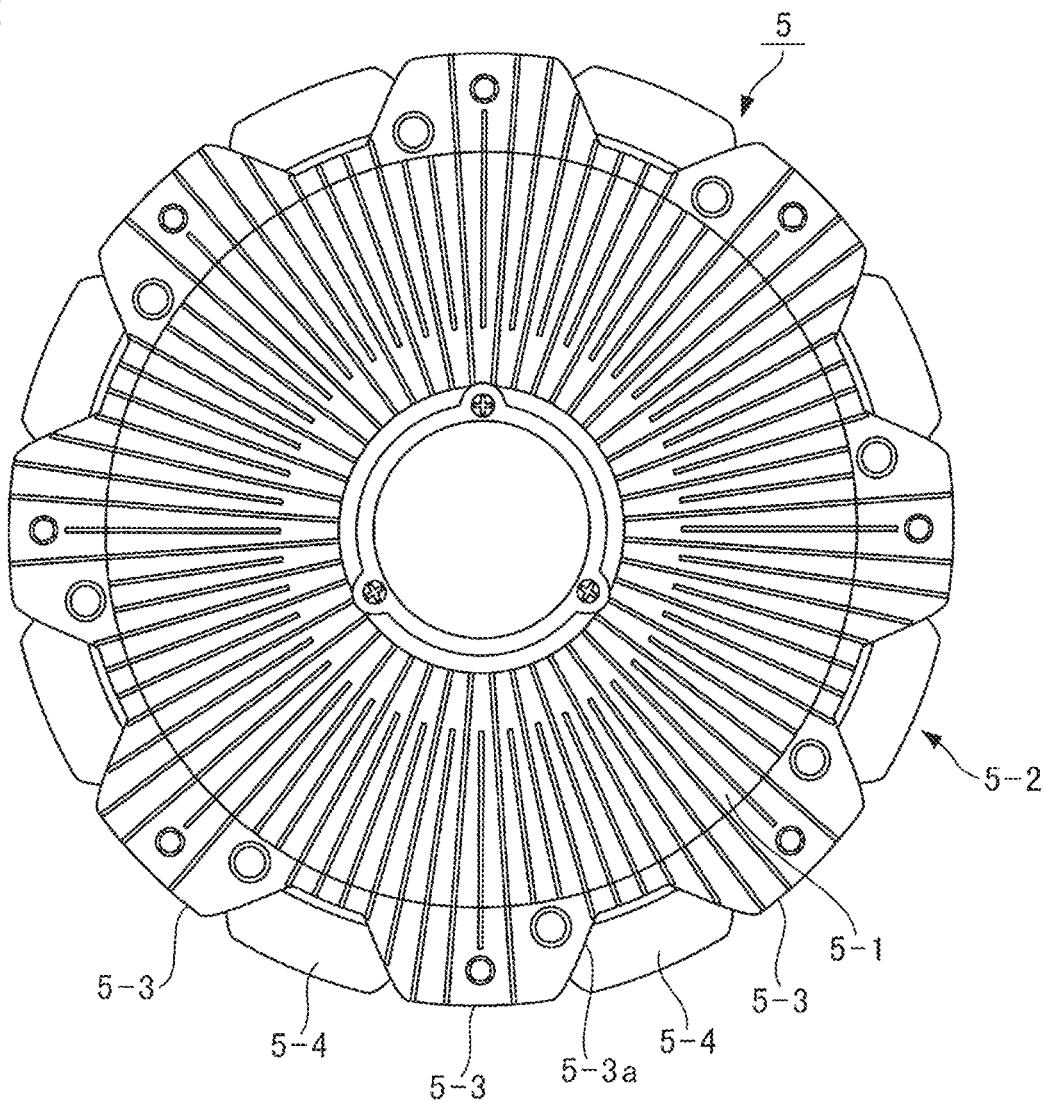
FIG. 2 is a view of a housing part of the fluid fan clutch (without a fan) depicted in FIG. 1 when viewed from the axial direction.
Figure 3:
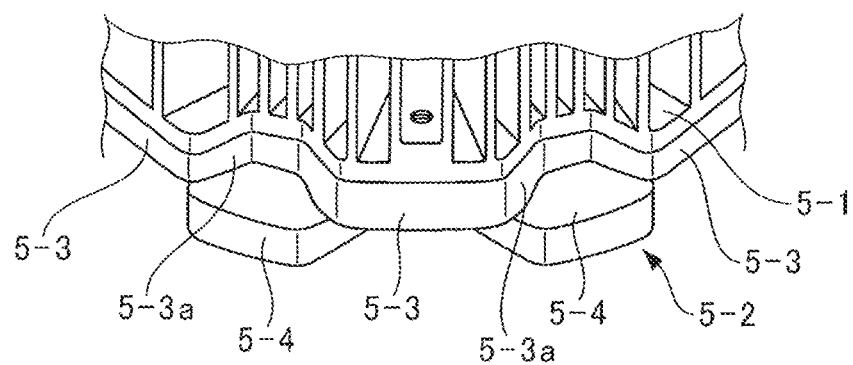
FIG. 3 is a perspective view of a partially-enlarged side surface of the housing part depicted in FIG. 1.

The fluid fan clutch of the first embodiment according to the present invention has a mechanism in which the fan 2 attached to the housing 5 via the flange ring 11 rotates. The connection structure of that fan 2 and the fan clutch is as follows. In the fan clutch in which the fan 2 is removably fixed by the flange ring 11, as depicted in FIG. 2 and FIG. 3, the front-side housing component (cover) 5-1 of the housing 5 has radial fan fixing projections (convex parts) 5-3 arranged at regular intervals in the circumferential direction on the outer circumference of the housing, the back-side housing component (case) 5-2 has fan air backflow prevention projecting parts 5-4 arranged at concave parts 5-3a formed between the fixing projections so as to be shifted in the circumferential direction with respect to the fan fixing projections 5-3 and, with the front-side housing component 5-1 stacked on this back-side housing component 5-2 equipped with the projecting parts, the flange ring 11, the front-side housing component 5-1, and the back-side housing component 5-2 are bolt-fastened.

Figure 5:
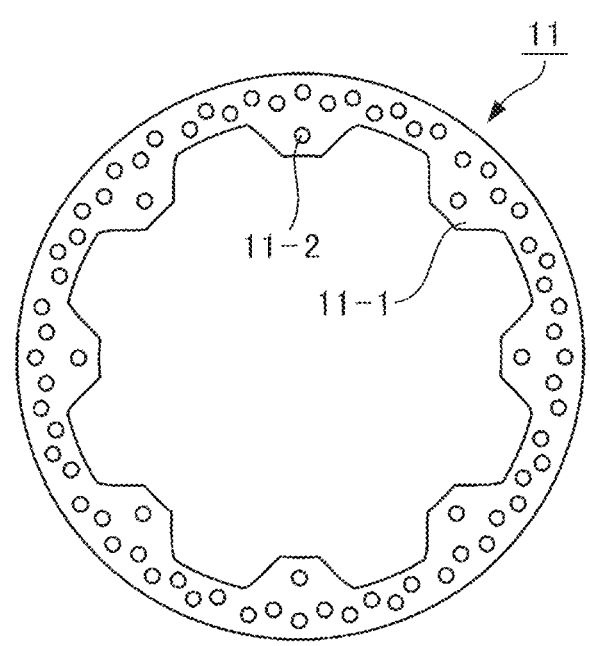
FIG. 5 is a view of a flange ring of the fan in the fluid fan clutch when viewed from the axial direction.

Note that the flange ring 11 has, as depicted in FIG. 5, an inner diameter slightly larger than the outer diameter of the clutch main body 1, and has fixing projections 11-1 project from its inner diameter surface to the inside in the radial direction. That is, the inner contour of the flange ring 11 corresponds to the outer contour of the housing (sealed container) 5, and therefore both components are made to be able to fit in in the axial direction. In the drawing, 11-2 denotes a bolt fastening hole for the front-side housing component (cover) 5-1.

Figure 4:
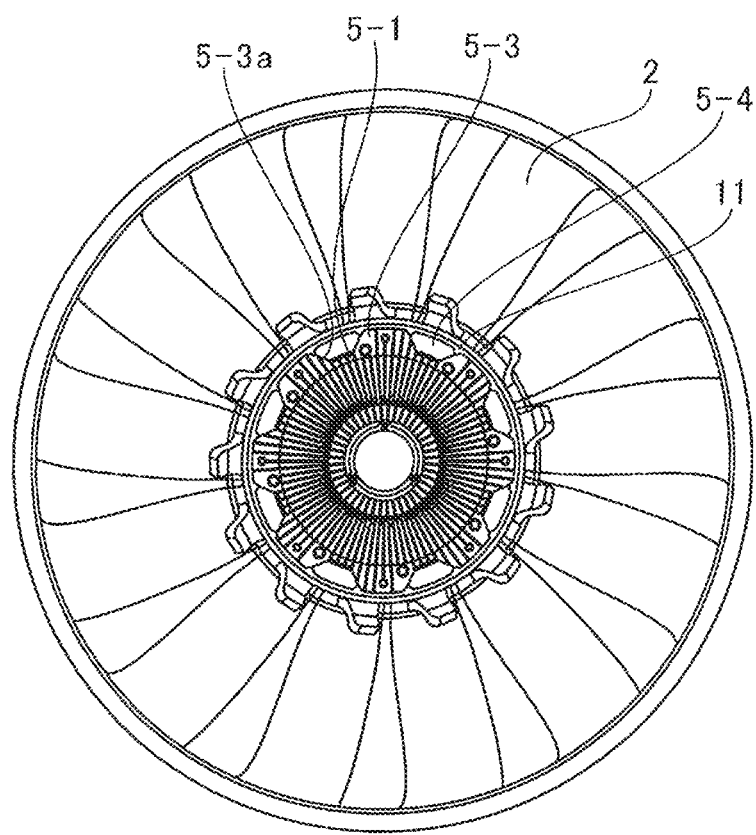
FIG. 4 is a view of a front-side housing part of the fluid fan clutch (with the fan) depicted in FIG. 1 when viewed from the axial direction.

FIG. 4 is a view of a front-side housing part of the fun-including fluid fan clutch depicted in FIG. 1 including the fan 2 attached via the flange ring 11 when viewed from the axial direction. By the fan air backflow prevention projecting parts 5-4 arranged to be equiangularly spaced on the outer periphery of the back-side housing component 5-2, air draft from the concave parts 5-3a is reduced, thereby preventing a decrease in the volume of air of the fan of the fluid fan clutch.

Figure 6:
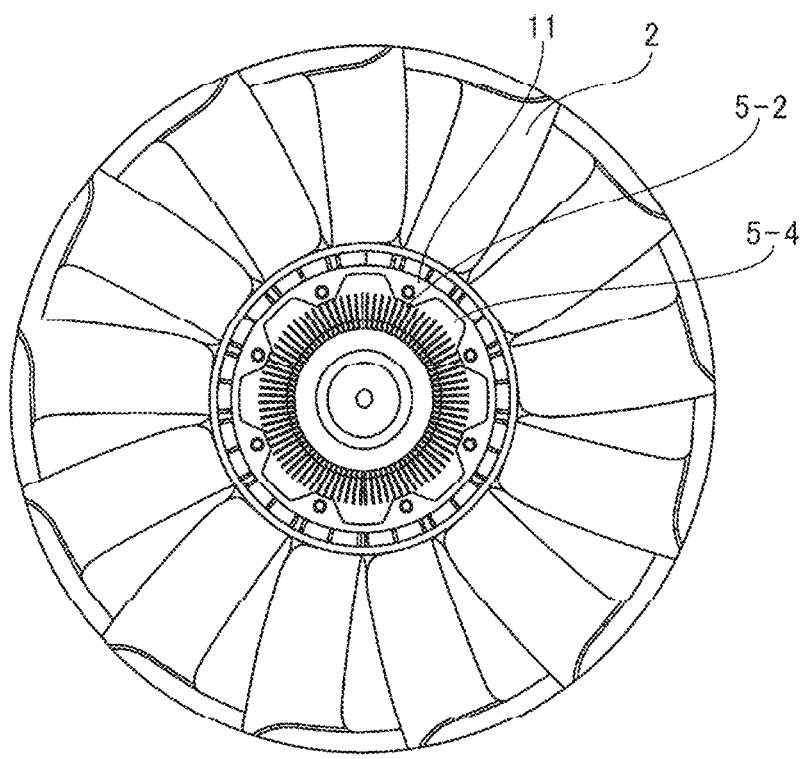
FIG. 6 is a view of a back-side housing part of the fluid fan clutch (with the fan) depicted in FIG. 1 when viewed from the axial direction.

FIG. 6 depicts a view of a back-side housing part of the fluid fan clutch including the fan 2 attached via the flange ring 11 when viewed from the axial direction. As with the one depicted in FIG. 4 described above, by the fan air backflow prevention projecting parts 5-4 arranged to be equiangularly spaced on the outer periphery of the back-side housing component 5-2, the air draft from the concave parts 5-3a is reduced when the fan clutch is activated, thereby allowing prevention of a decrease in the volume of air of the fan of the fan clutch and improving fan performance. Furthermore, since the fan air backflow prevention scheme of the present invention is not a backflow prevention scheme by a separate component, it is also possible to achieve effects of reducing an increase in the number of components and an increase in the number of processes at the time of assembling.

Figure 7:
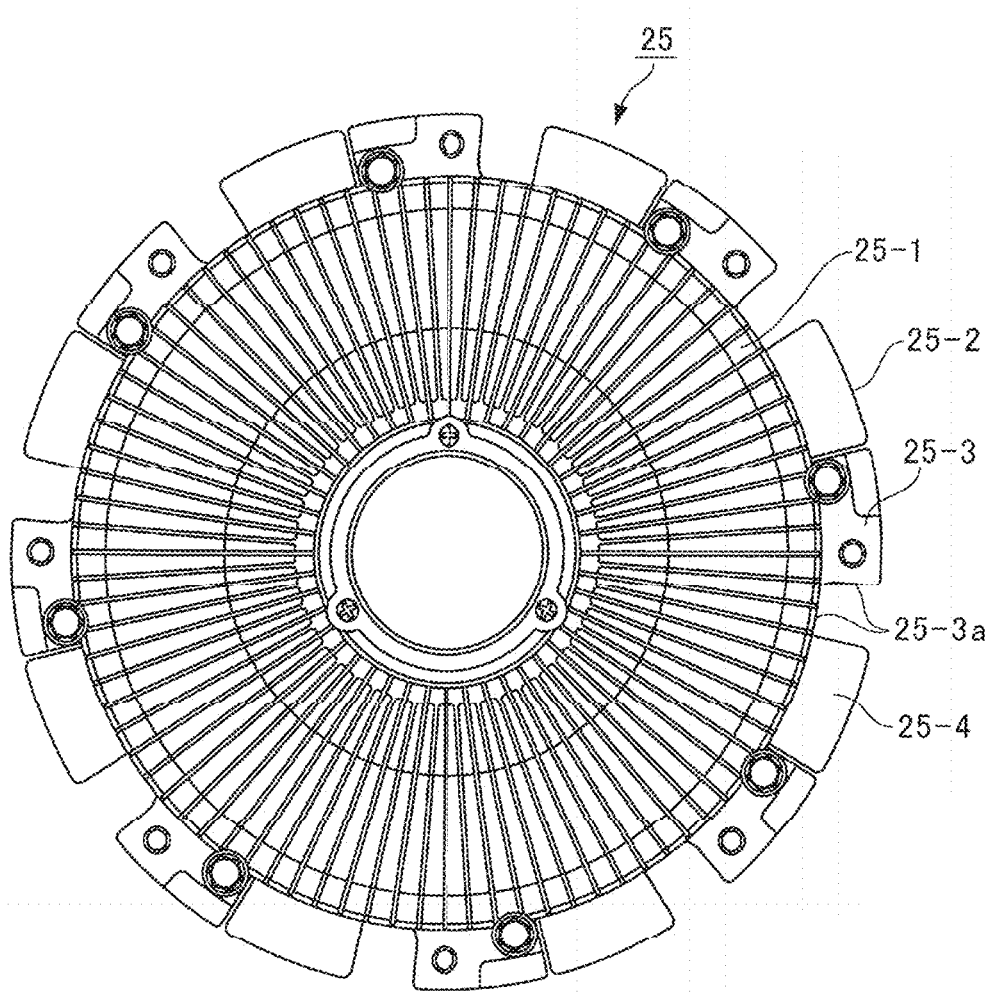
FIG. 7 is a view of a housing part of a fluid fan clutch (without a fan) according to a second embodiment of the present invention when viewed from the axial direction.
Figure 8:
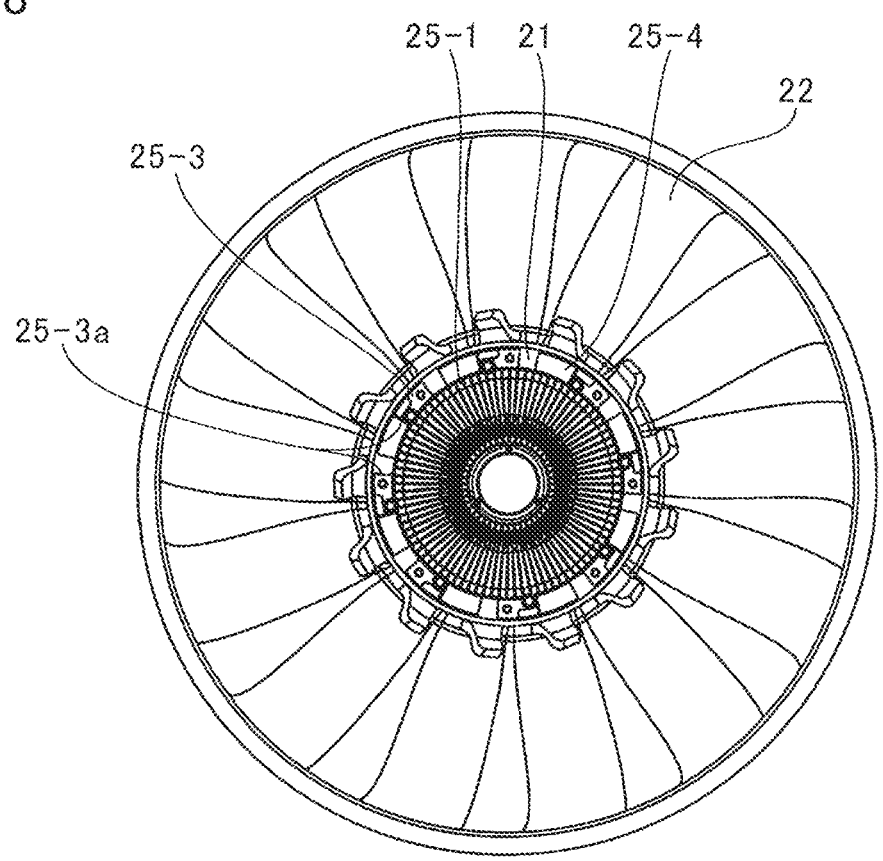
FIG. 8 is a view of a front-side housing part of the fluid fan clutch (with the fan) also according to the second embodiment of the present invention when viewed from the axial direction.
Figure 9:
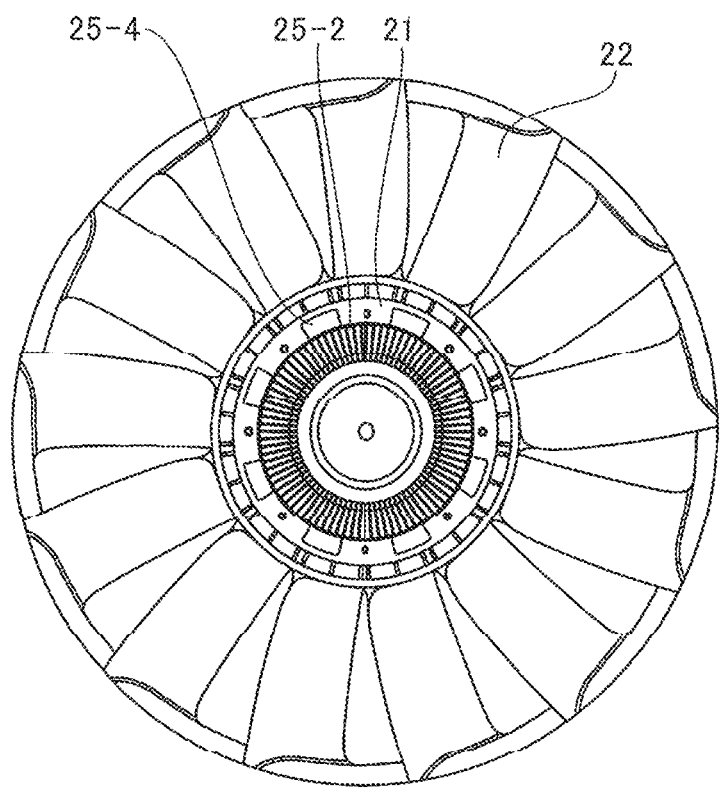
FIG. 9 is a view of a back-side housing part of the fluid fan clutch (with the fan) also according to the second embodiment of the present invention when viewed from the axial direction.

Next, a fluid fan clutch according to the second embodiment of the present invention depicted in FIG. 7 to FIG. 9 is described. Also the fluid fan clutch according to this second embodiment has a mechanism in which, as with the fluid fan clutch according to the above-described first embodiment, a fan 22 attached to a housing 25 via a flange ring 21 similar to the above rotates. The connection structure of that fan 22 and the fan clutch is as follows. In the fan clutch in which the fan 22 is removably fixed by the flange ring 21, a front-side housing component (cover) 25-1 of the housing 25 has rectangular-shaped fan fixing projections (convex parts) 25-3 arranged at regular intervals in the circumferential direction on the outer circumference of the housing, a back-side housing component (case) 25-2 has rectangular-shaped fan air backflow prevention projecting parts 25-4 arranged at rectangular-shaped concave parts 25-3a formed between the fixing projections so as to be shifted in the circumferential direction with respect to the fan fixing projections 25-3 and, with the front-side housing component 25-1 stacked and bolt-fastened onto this back-side housing component 25-2 equipped with the projecting parts, the flange ring 21 is further bolt-fastened to the front-side housing component 25-1.

FIG. 8 is a view of a front-side housing part of the fluid fan clutch including the fan 22 attached via the flange ring 21 similarly with FIG. 4 described above, when viewed from the axial direction. By the fan air backflow prevention projecting parts 25-4 arranged to be equiangularly spaced on the outer periphery of the back-side housing component 25-2, air draft from the concave parts 25-3a is reduced, thereby preventing a decrease in the volume of air of the fan of the fluid fan clutch.

FIG. 9 is a view of a back-side housing part of the fluid fan clutch including the fan 22 attached via the flange ring 21 similarly with FIG. 6 described above, when viewed from the axial direction. As with the one depicted in FIG. 6 described above, by the fan air backflow prevention projecting parts 25-4 arranged to be equiangularly spaced on the outer periphery of the back-side housing component 25-2, the air draft from the concave parts 25-3a is reduced when the fan clutch is activated, thereby allowing prevention of a decrease in the volume of air of the fan of the fluid fan clutch and improving fan performance. Also in the present embodiment, as with the one described above, since the fan air backflow prevention scheme is not a backflow prevention scheme with a separate component, it is also possible to achieve effects of reducing an increase in the number of components and an increase in the number of processes at the time of assembling.

Note that in the fluid fan clutch of the present invention, the fan fixing projections (convex parts) 5-3, 25-3 formed on the front-side housing component (cover) 5-1, 25-1 of the housing 5, 25, the concave parts 5-3a, 25-3a formed with respect to the fan fixing projections 5-3, 25-3 between the fixing projections, and the fan air backflow prevention projecting part 5-4, 25-4 formed on the back-side housing component (case) 5-2, 25-2 each have a shape when viewed from the axial direction not limited to any of the shapes described herein, and it goes without saying that similar operations and effects can be acquired when the shape is, for example, a trapezoidal shape, a semi-arc shape, or the like.

The invention claimed is:

1. A fluid fan clutch, wherein a fan is removably fixed to a housing via a flange ring with a bolt, the housing is composed of a front-side housing component and a back-side housing component and has radial fan fixing projections arranged at regular intervals in a circumferential direction on an outer circumference of the front-side housing component, and the flange ring is capable of fitting in the housing from a front side or a back side of the fan clutch, characterized in that the back-side housing component is provided with projecting parts for preventing backflow of fan air integrally with the back-side housing component, and the projecting parts are arranged to be shifted in a circumferential direction with respect to the fan fixing projections of the front-side housing component.

* * * * *